(12) United States Patent
Kitaura et al.

(10) Patent No.: US 9,061,387 B2
(45) Date of Patent: Jun. 23, 2015

(54) ARTICLE POSITIONING MECHANISM

(75) Inventors: Ichiro Kitaura, Hyogo (JP); Takayuki Munechika, Hyogo (JP)

(73) Assignee: Pascal Engineering Corporation, Hyogo (JP)

( * ) Notice: Subject to any disclaimer, the term of this patent is extended or adjusted under 35 U.S.C. 154(b) by 811 days.

(21) Appl. No.: 13/261,119

(22) PCT Filed: Jun. 29, 2010

(86) PCT No.: PCT/JP2010/061029
§ 371 (c)(1),
(2), (4) Date: Jan. 3, 2012

(87) PCT Pub. No.: WO2011/004732
PCT Pub. Date: Jan. 13, 2011

(65) Prior Publication Data
US 2012/0112398 A1 May 10, 2012

(30) Foreign Application Priority Data

Jul. 8, 2009 (JP) .................................. 2009-162192

(51) Int. Cl.
| | | |
|---|---|---|
| B25B 27/14 | (2006.01) | |
| B23Q 3/18 | (2006.01) | |
| B23B 29/20 | (2006.01) | |
| B23K 37/053 | (2006.01) | |

(52) U.S. Cl.
CPC ............ B23Q 3/183 (2013.01); *Y10T 29/5155* (2015.01); *Y10T 82/2587* (2015.01); *B23K 37/0533* (2013.01); B23B 29/20 (2013.01)

(58) Field of Classification Search
USPC ...................................................... 29/281.1
See application file for complete search history.

(56) References Cited

U.S. PATENT DOCUMENTS

| | | | | |
|---|---|---|---|---|
| 3,711,106 A | * | 1/1973 | Hogan et al. ................... | 279/123 |
| 3,898,714 A | * | 8/1975 | McFadden .................... | 29/281.1 |
| 4,753,555 A | * | 6/1988 | Thompson et al. ............ | 408/1 R |
| 5,607,263 A | * | 3/1997 | Nespeta et al. ................. | 407/61 |
| 5,822,841 A | * | 10/1998 | Bales et al. .................... | 29/281.1 |
| 6,955,347 B2 | * | 10/2005 | Kawakami et al. ............ | 269/309 |
| 7,021,615 B2 | * | 4/2006 | Kuroda .......................... | 269/309 |
| 8,087,651 B2 | * | 1/2012 | Dahlquist ...................... | 269/309 |

(Continued)

FOREIGN PATENT DOCUMENTS

| | | |
|---|---|---|
| JP | 5-078406 | 10/1993 |
| JP | 2000-246521 | 9/2000 |

(Continued)

*Primary Examiner* — Lee D Wilson
*Assistant Examiner* — Alvin Grant
(74) *Attorney, Agent, or Firm* — Jordan and Hamburg LLP

(57) ABSTRACT

An article positioning mechanism for positioning an article comprising a component or a tool with respect to a mounting portion of a movable member of a mechanical device and also restraining rotation thereof includes a holder member to which the article is fixed and a frame shaped member that is fixed to the mounting portion, the holder member including position regulation surfaces and a tapered male engagement portion that is formed as a regular polygon and also is sloped so as to approach its axis in the direction towards the mounting portion, the frame shaped member including a reference surface that receives the position regulation surfaces and positions them in the axial direction, and a tapered female engagement portion that is formed as a regular polygon and also is sloped in the same direction as the tapered male engagement portion.

10 Claims, 8 Drawing Sheets

(56) References Cited

U.S. PATENT DOCUMENTS

2006/0196325 A1 9/2006 Sakai
2008/0061486 A1* 3/2008 Kuroda et al. ............... 269/48.1
2012/0321410 A1* 12/2012 Kitaura et al. .................. 411/55

FOREIGN PATENT DOCUMENTS

| | | |
|---|---|---|
| JP | 2006-167862 | 6/2006 |
| WO | WO-01/76814 | 10/2001 |

* cited by examiner

ARTICLE POSITIONING MECHANISM

BACKGROUND OF THE INVENTION

The present invention relates to an article positioning mechanism, and in particular relates to such a mechanism in which an article consisting of a component or a tool is held by a holder member that has a tapered male engagement portion, a frame shaped member that has a tapered female engagement portion is provided on a mounting portion of a movable member of a mechanical device, and positioning and rotational restriction are performed by the tapered male engagement portion being engaged with the tapered female engagement portion in a closely contacting manner.

In the past, when processing a workpiece with a mechanical device of some type such as a machine tool or a robot or the like, an article associated with this task such as a component or a tool or the like must be positioned via a holder member with respect to a mounting portion of a movable member of the mechanical device, along with its rotation being restricted. In order to do this, article positioning mechanisms of various types have been developed and implemented in practice that are capable of positioning an article at good accuracy while also reliably restricting its rotation. In particular, in order to process a workpiece at high accuracy with a machine tool, it is necessary to position a tool holder that is holding a rotational tool or a machining tool or the like at high accuracy with respect to the main axis of the machine tool or with respect to a turret thereof, while also reliably restricting its rotation.

Now, as such an article positioning mechanism described above, for example, in Patent Document #1 there is disclosed a positioning mechanism for positioning a tool holder on a turret of a tool post at high accuracy. With this positioning mechanism, four concave shaped key grooves are formed on an outer peripheral neighboring portion of a turret mounting surface of the tool holder, and three convex shaped keys are formed on a holder mounting surface of the turret of the tool post so as to correspond to these key grooves. When the tool holder is attached to the turret, by the mounting surface of the tool holder being contacted against the mounting surface of the turret and each one of three of the four key grooves being engaged with the one of the three keys that corresponds thereto, the tool holder is positioned in the vertical direction and also in the horizontal direction with respect to the mounting surface of the turret, and moreover its rotation with respect to the turret is restrained.

Patent Document #1: Japanese Laid Open Patent Publication 2006-167862.

However, with the positioning mechanism of Patent Document #1 described above, in order for the engagement surfaces of the plurality of key grooves to engage reliably with the engagement surfaces of the plurality of keys, it is necessary to perform minute adjustment of the sizes of the various keys and of the various key grooves that correspond to them. In order to make these minute adjustments, as a final process, it is necessary to perform comparison and adjustment by hand, and this task consumes a great deal of labor and time. Since a slight clearance needs to be present between the engagement surfaces of each of the keys and each of the key grooves in order for each of the plurality of keys to engage with each of the plurality of key grooves, it becomes very difficult to improve the positioning accuracy as far as, for example, 2 or 3 μm.

Moreover since the task of engaging each of the plurality of key grooves with its corresponding key takes a great deal of labor, accordingly there is a fear that, while contacting the turret fitting surface of the tool holder against the holder fitting surface of the turret, damage will be caused to the engagement surfaces of the key grooves and to the engagement surfaces of the keys, and this would decrease the durability. Furthermore there is also the problem that, when positioning the plurality of keys with the plurality of key grooves, the force for restricting mutual rotation may become weak due to inadequacy of rigidity of the keys or of the key grooves, since these structural members are small in size, The objects of the present invention are to provide an article positioning mechanism that is capable of reliably restricting rotation while also being capable of positioning at high accuracy, to provide an article positioning mechanism whose strength and durability are excellent, and so on.

The article positioning mechanism of the present invention is an article positioning mechanism for positioning of an article comprising a component or a tool with respect to a mounting portion of a movable member of a mechanical device so as to restrict the rotation thereof, characterized by comprising a holder member to which the article is fixed and a frame shaped member fixed to the mounting portion, the holder member comprising a position regulation surface that is orthogonal to an axis of the mounting portion, and a tapered male engagement portion formed in a regular polygonal shape that, in cross section in the direction orthogonal to the axis, has a plurality of circular arcuate corner portions that are convex outwards and a plurality of side portions, and that is sloped in such a manner that the closer the tapered male engaging portion is to the mounting portion, the closer the tapered male engaging portion is to the axis, the frame shaped member comprising a reference surface that receives and stops the position regulation surface and positions it in the axial direction, and a tapered female engagement portion formed in a regular polygonal shape that, in cross section in the direction orthogonal to the axis, has a plurality of circular arcuate corner portions that are convex outwards and a plurality of side portions, and that moreover slopes in the same direction as the tapered male engagement portion; and, when the holder member is fixed to the mounting portion or to the frame shaped member by a fixing means, the tapered male engagement portion is engaged to the tapered female engagement portion in a closely contacting manner via elastic deformation of the outer peripheral side wall portion of the tapered female engagement portion in the radial direction outwards from the axis and in the direction to approach the mounting portion

SUMMARY OF THE INVENTION

According to the present invention, when the holder member is fixed to the mounting portion or to the frame shaped member with a fixing means, the tapered male engagement portion is engaged to the tapered female engagement portion in a closely contacting manner via elastic deformation of the outer peripheral side wall portion of the tapered female engagement portion in the radial direction away from the axis and also in the direction to approach the mounting portion, accordingly, with this article positioning mechanism, it is possible to position the holder member to which the article is fixed with respect to the mounting portion at high accuracy, and it is possible also reliably to restrain the rotation of the holder member. As compared to the case disclosed in Patent Document #1 in which the positioning and rotational restriction is performed by using small structural members such as the plurality of keys and key grooves, with the present invention it is possible to enhance the rigidity of the positioning mechanism, since the positioning and rotational restriction are performed by using the tapered male and female engagement portions which are shaped in regular polygonal shapes. And, since only a single pair consisting of one tapered male engagement portion and one tapered female engagement portion is engaged together, accordingly it is possible to perform this engagement smoothly as compared with the case of engagement of a combination of a plurality of pairs of key grooves and keys, and it is possible to avoid superfluous contacting of the engagement surfaces, so that an article positioning mechanism is realized whose durability is excellent.

In addition to the structure of the present invention as described above, it would be acceptable to arrange also to employ various other structures, as explained below.

(1) Each of a plurality of side portions of the tapered male engagement portion may have a concave release portion formed at its central portion and a pair of contact surfaces formed at both sides of the concave release portion, with each of a plurality of side portions of the tapered female engagement portion having a concave release portion formed at its central portion and a pair of contact surfaces formed at both sides of the concave release portion. According to this structure, when the tapered male engagement portion and the tapered female engagement portion are engaged together in a closely contacting manner, the positioning accuracy in the direction orthogonal to the axis of the mounting portion and the rotation restraining force are enhanced, since the number of closely contacting regions provided on the pairs of contact surfaces is doubled. Moreover, it is possible to promote the elastic deformation in the direction to increase the radius, and thereby to enhance the adherence, due to the fact that the compressive stress between the pairs of contact surfaces is increased by the provision of the side portions and the concave release portions. Yet further, it is possible to reduce the cost of grinding and polishing, since it is not necessary to perform any grinding or polishing upon the surfaces of the concave release portions.

(2) The rectangular polygonal shape of the tapered male engagement portion and of the tapered female engagement portion may be a regular quadrilateral, and each of the plurality of side portions of the tapered male engagement portion may be formed as a circular arc that bulges slightly outwards, with each of the plurality of side portions of the tapered female engagement portion also being formed as a circular arc that bulges slightly outwards. According to this structure, when the tapered male engagement portion is engaged with the tapered female engagement portion in a closely contacting manner, the contact areas between the side portions of the tapered male engagement portion and the tapered female engagement portion are increased, so that is possible to perform centering of a tool holder at high accuracy, whereby it is possible to enhance the concentricity.

(3) An annular space may be formed on an inner side of an outer peripheral side wall portion of the tapered female engagement portion for promoting elastic deformation in the direction towards the mounting portion when the tapered male engagement portion is engaged with the tapered female engagement portion in a closely contacting manner. According to this structure, with this annular space, it is possible to promote elastic deformation of the tapered female engagement portion of the frame shaped member in the direction to approach the mounting portion.

(4) The holder member may comprise a male engagement portion definition member on which the tapered male engagement portion is formed, and a holder main body to which the male engagement portion definition member is fixed by a plurality of bolts. According to this structure, the productivity is enhanced by forming the tapered male engagement portion integrally with the holder main body, and, since this male engagement portion definition member is fixed to the holder main body with the plurality of bolts, accordingly it can be applied to holder main bodies of various different shapes.

(5) The movable member of the mechanical device may be a turret of a turret type lathe, and this turret may comprise a plurality of the mounting portions on its outer peripheral portion, with the frame shaped member being provided to each of the mounting portions. According to this structure, it is possible to position the plurality of holder members with respect to the plurality of mounting portions of this turret type lathe at high accuracy, and moreover reliably to restrict their rotation.

(6) The frame shaped member may be positioned with respect to the mounting portion by a plurality of knock pins and is fixed thereto by a plurality of bolts. According to this structure, the repeatability is enhanced since the frame shaped member can be repeatedly fitted to the mounting portion and removed therefrom, and the productivity is enhanced due to the tapered female engagement portion being formed integrally with the mounting portion.

DESCRIPTION OF THE PREFERRED EMBODIMENTS

In the following, embodiments for implementation of the present invention will be explained on the basis of the drawings.

First, a turret 1 to which the article positioning mechanism 10 of the present invention is applied will be explained.

Figure 1:
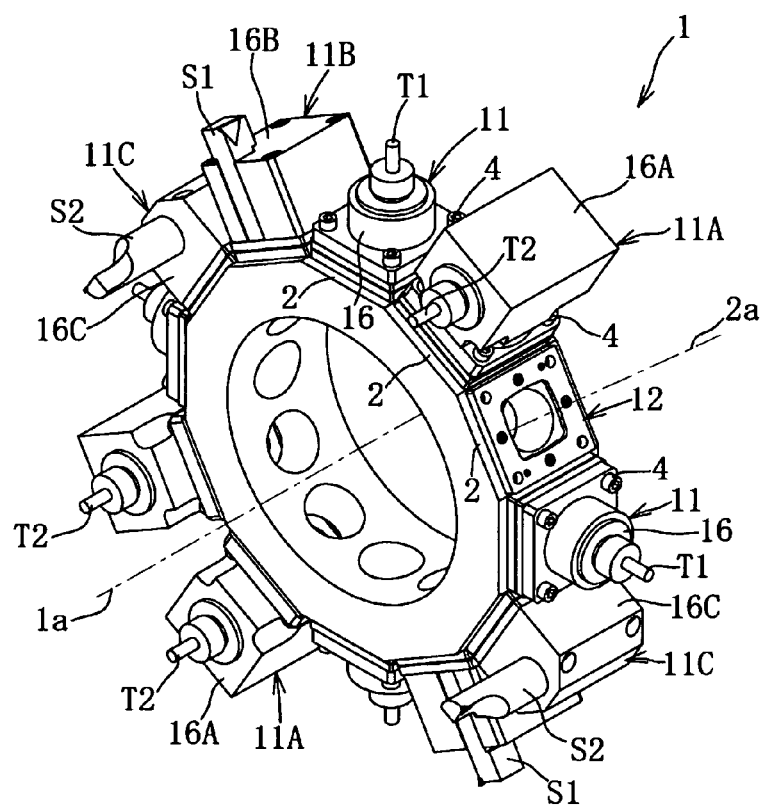
FIG. 1 is a perspective view of a turret and an article positioning mechanism according to an embodiment of the present invention.
Figure 2:
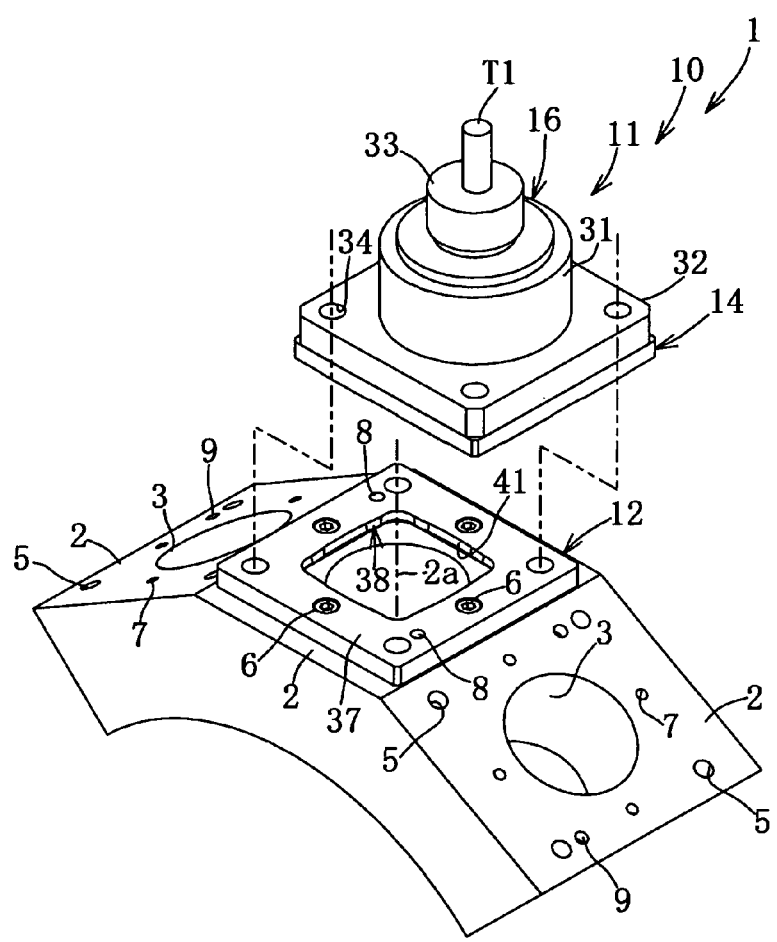
FIG. 2 is an enlarged perspective view of an essential portion of this turret and of this article positioning mechanism.

The turret 1 (corresponding to the "movable member of the mechanical device") is a device that is attached to a turret type lathe. As shown in FIGS. 1 and 2, the turret 1 has an annular structure, and a plurality of mounting portions 2 are provided on its outer peripheral portion. A frame shaped member 12 of an article positioning mechanism 10 is provided on each of these mounting portions 2. To each of the plurality of mounting portions 2, via its frame shaped member 12, there is fixed one of a plurality of holder members 11 through 11C such as rotational tool holder members 11, 11A that hold rotating tools such as a cutting drill T1 that is driven along the direction of the axis 2a of the mounting portion 2 or an end mill T2 that cuts an aperture in a direction orthogonal to the direction of the axis 2a or the like, or machining tool holder members 11B, 11C that hold machining tools such as bytes S1, S2 or the like.

Although this feature is not shown in the figures, the turret 1 is supported on a tool slide main body of a turret type lathe so as to be capable of being rotationally driven. The turret 1 is rotated by an indexing mechanism (not shown in the figures) and for example, among the plurality of holder members 11 through 11C that are attached to the turret 1, the rotational tool holder member 11 that is holding the end mill T1 may be brought to and held at a processing position, the rotational tool T1 held by this holder member 11 may be rotated by a rotational driving mechanism (not shown in the figures), and thereby it is possible to perform a cutting process on the workpiece.

In this explanation of an article positioning mechanism 10, since the plurality of article positioning mechanisms 10 deployed on the plurality of mounting portions 2 on the turret 1 all have the same construction, accordingly here only a single one of these article positioning mechanisms 10 will be explained. Thus it should be understood that, while the holder members 11 include both machining tool holder members 11 and 11A and rotational tool holder members 11B and 11C, here the rotational tool holder 11 to which the end mill T1 is fixed will be explained as an example.

As shown in FIGS. 1 and 2, on each of the plurality of mounting portions 2 of the turret 1, there are formed: a vertical axis 2a; an axial hole 3 into which is inserted a rotational shaft (not shown in the figures) of the rotational tool T1 that is held by the holder member 11, four bolt holes 5 in each of which is screwingly engaged one of four bolts 4 for fixing the holder member 11 to the mounting portion 2, four bolt holes 7 for screwingly engaging four bolts 6 respectively for fixing the frame shaped member 12 to the mounting portion 2, and two pin holes 9 into which are inserted knock pins 8 for positioning the frame shaped member 12. The turret 1 of this embodiment has twelve of the mounting portions 2 on its outer peripheral portion.

As shown in FIGS. 1 through 11, the article positioning mechanism 10 includes the holder member 11 to which the tool T1 is fixed and the frame shaped member 12 that is fixed to the mounting portion 2. This article positioning mechanism 10 is a device for fixedly determining the position of the holder member 11 (which corresponds to the "article consisting of a component or a tool") with respect to the mounting portion 2 of the turret 1 via the frame shaped member 12, while also restricting the rotation thereof.

Next, the frame shaped member 12 will be explained.

As shown in FIGS. 1 through 3, 6, 7, 10, and 11, the frame shaped member 12 is made from steel, and is formed as a plate shaped member that is square in plan view. This frame shaped member 12 has an aperture 40, outer peripheral side wall portions 12a (shown in FIG. 7), a reference surface 37 that receives position regulation surfaces 17 of the holder member 11 and thereby positions the holder member 11 along the direction of the axis 2a, a tapered female engagement portion 38 that is sloped in the same direction as a tapered male engagement portion 18 of the holder member 11, and so on. The frame shaped member 12 is positioned with respect to the mounting portion 2 by the two knock pins 8 and is fixed thereto by the four bolts 6. The aperture 40 is formed so that, on the upper surface portion of the frame shaped member 12, its side has a length around 0.5 to 0.6 times the length of the side of the member 12.

Next, the reference surface 37 will be explained.

Figure 10:
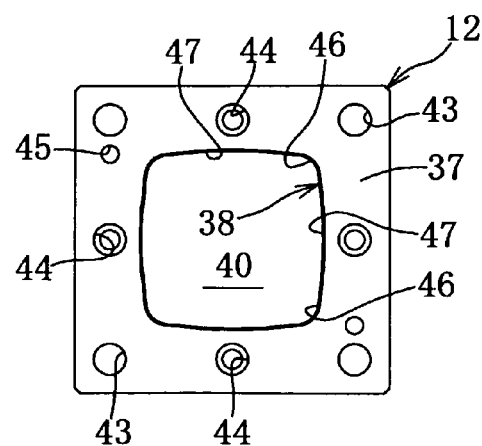
FIG. 10 is a plan view of a frame shaped member of the article positioning mechanism.

As shown in FIGS. 2 and 10, the reference surface 37 is formed on the upper surface of the frame shaped member 12. In this reference surface 37, there are formed four insertion holes 43 into which the four bolts 4 are inserted, four bolt installation holes 44 into which the four bolts 6 are inserted, and two pin holes 45 into which the two knock pins 8 are inserted.

Next, the tapered female engagement portion 38 will be explained.

As shown in FIGS. 2, 3, 10, and 11, the cross section of the tapered female engagement portion 38 in the direction orthogonal to the axis 2a has four circular arcuate corner portions 46 that are convex outwards and four side portions 47, and is formed in the shape of a regular quadrilateral (or in the shape of a pseudo-regular quadrilateral, in the shape of an approximately regular quadrilateral, or in a shape that is close to that of a regular quadrilateral). The tapered female engagement portion 38 is formed in a sloping shape, so as to approach closer towards the axis 2a in the direction towards the axis 1a of the turret 1. The tapered female engagement portion 38 is formed integrally with the upper circumferential wall portion 41 of the aperture 40 of the frame shaped member 12. Each of the plurality of side portions 47 of the tapered female engagement portion 38 is formed as a circular arc having a minute curvature and bulging outwards slightly towards the exterior.

Figure 11:
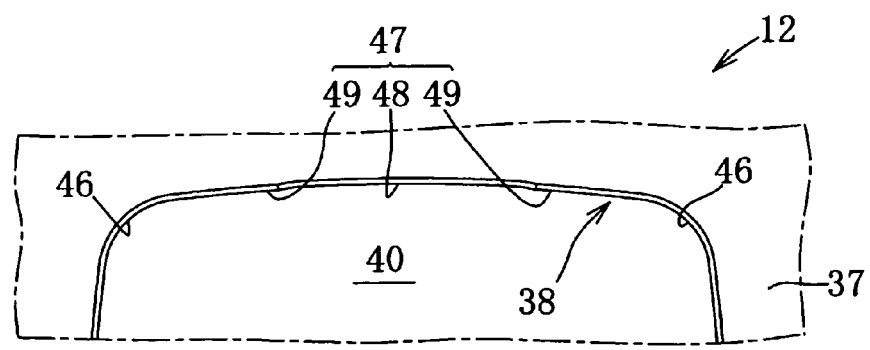
FIG. 11 is an enlarged bottom view of an essential portion of FIG. 10.

Each of the plurality of side portions 47 of the tapered female engagement portion 38 has a concave release portion 48 formed at its central portion and a pair of contact surfaces 49 that are formed on both sides of this concave release portion 48 (shown in FIG. 11). The concave release portions 48 of the tapered female engagement portion 38 are formed in the upper circumferential wall portion 41 of the aperture 40 of the frame shaped member 12 in the shape of very shallow grooves along the direction of the axis 2a. The concave release portions 48 are formed over about half of the extent of the side portions 47.

Next, an annular space 40a will be explained.

Figure 3:
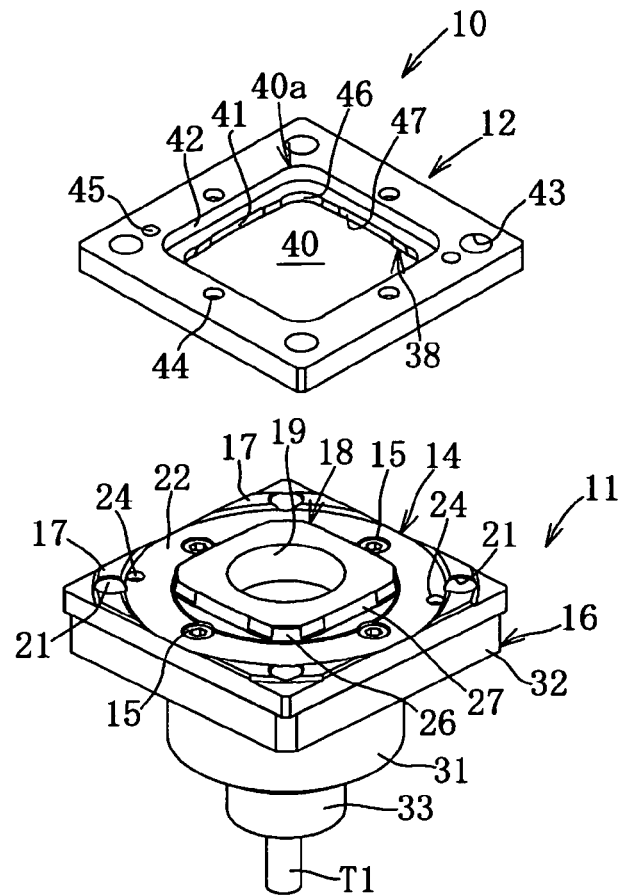
FIG. 3 is a perspective view of the article positioning mechanism.
Figure 4:
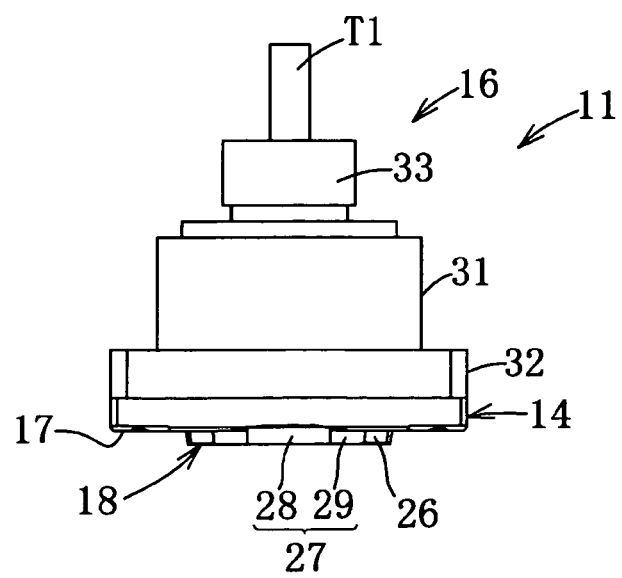
FIG. 4 is a side view of a holder member of the article positioning mechanism.
Figure 5:
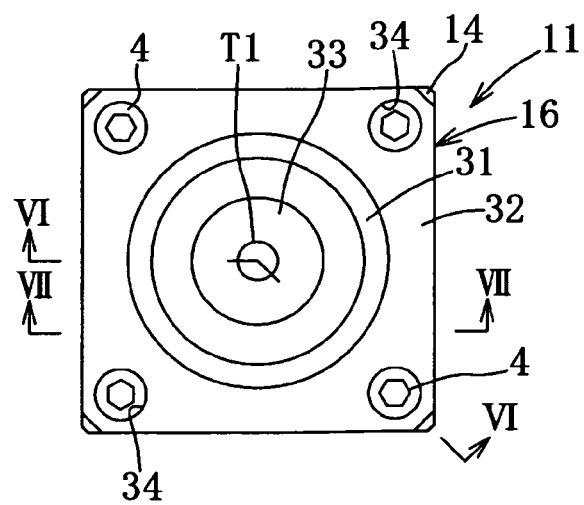
FIG. 5 is a plan view of the article positioning mechanism.
Figure 6:
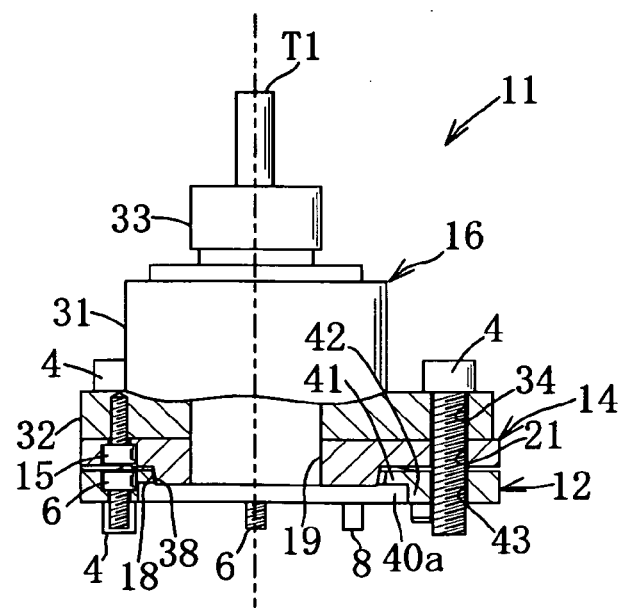
FIG. 6 is a sectional view of FIG. 5 along lines VI VI.
Figure 7:
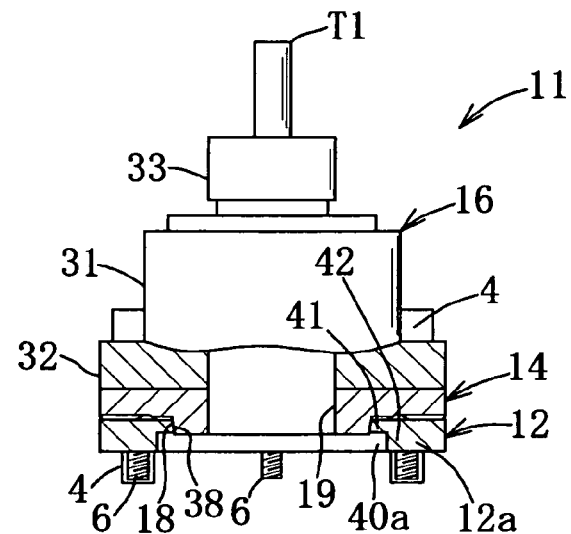
FIG. 7 is a sectional view of FIG. 5 along lines VII VII.

As shown in FIGS. 3, 6, and 7, an annular space 40a is formed on the inner side of the upper circumferential wall portion 41 of the aperture 40. This annular space 40a is for promoting elastic deformation in the direction to approach towards the mounting portion 2 (i.e., inwards) when the tapered male engagement portion 18 is engaged to the tapered female engagement portion 38 in a closely contacting manner. The annular space 40a is formed on the internal periphery of the lower circumferential wall portion 42 of the aperture 40.

Next, the holder member 11 will be explained.

As shown in FIGS. 1 through 9, the holder member 11 has a male engagement portion definition member 14 on which the tapered male engagement portion 18 is formed, and a holder main body 16 to which this male engagement portion definition member 14 is fixed by a plurality of bolts 15.

Next, the holder main body 16 will be explained.

As shown in FIGS. 1 through 7, the holder main body 16 is built from a main body portion 31, a flat plate portion 32 to which the male engagement portion definition member 14 is fixed, a tool holding portion 33, and so on. The end mill T1 is fixed to this tool holding portion 33. When the end mill T1 is to be rotationally driven, the rotation shaft of the end mill T1 is linked to a rotational driving mechanism by a rotation shaft, but detailed explanation will here be omitted, since this is per se known technology. In order to fix the holder member 11 to one of the mounting portions 2 of the turret 1, four bolt installation holes 34, into which the four bolts 4 are inserted, are formed at the four corner portions of the flat plate portion 32 of this holder main body 16.

Next, the male engagement portion definition member 14 will be explained.

As seen in plan view, the male engagement portion definition member 14 is square, and is formed from a plate shaped member made from steel. The male engagement portion definition member 14 has position regulation surfaces 17 that are orthogonal to the axis 2a of the mounting portion 2, the tapered male engagement portion 18 that is sloped in such a manner that the closer the tapered male engaging portion 18 is to the mounting portion 2, the closer the tapered male engaging portion 18 is to the axis 2a, and a through hole 19 that communicates with the axial hole in the mounting portion 2.

Next, the position regulation surfaces 17 will be explained.

Figure 8:
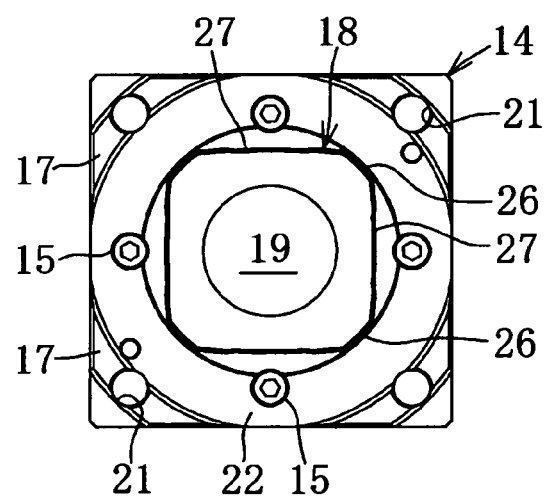
FIG. 8 is a bottom view of the holder member of the article positioning mechanism.

As shown in FIGS. 3 and 8, the position regulation surfaces 17 are defined at the four corner portions on the bottom surface of the male engagement portion definition member 14, and these are formed as circular arcs of about 45° as seen in plan view, at open corners at portions further to the exterior than the tapered male engagement portion 18. At the center portion of each of these position regulation surfaces 17, there is formed a through hole 21 through which one of the bolts 4 is passed (shown in FIG. 6). These position regulation surfaces 17 are contacted against the reference surface 37 and thus perform positional determination in the direction of the axis 2a.

A shallow concave annular groove 22 is formed radially inwards of these position regulation surfaces 17. Four bolt installation holes into which the four bolts 15 are inserted and two pin holes 24 into which two knock pins for positioning the male engagement portion definition member 14 on the holder main body 16 are inserted are formed in the shallow annular concave groove 22.

Next, the tapered male engagement portion 18 will be explained. As shown in FIGS. 3, 4, and 6 through 9, the cross section of the tapered male engagement portion 18 in the direction orthogonal to the axis 2a has four circular arcuate corner portions 26 that are convex outwards and four side portions 27, so that it is formed in the shape of a regular quadrilateral (or in the shape of a pseudo-regular quadrilateral, in the shape of an approximately regular quadrilateral, or in a shape that is close to that of a regular quadrilateral). The tapered male engagement portion 18 is formed so as to project integrally from the bottom surface of the male engagement portion definition member 14. The angle of inclination of the tapered male engagement portion 18 with respect to the axis 2a of the mounting portion 2 is desirably around 7° to 12° (refer to FIGS. 6 and 7). Each of the four side portions 27 of the tapered male engagement portion 18 is formed as a circular arc whose curvature is minute, so that it bulges slightly to the exterior (refer to the dashed line in FIG. 9).

Figure 9:
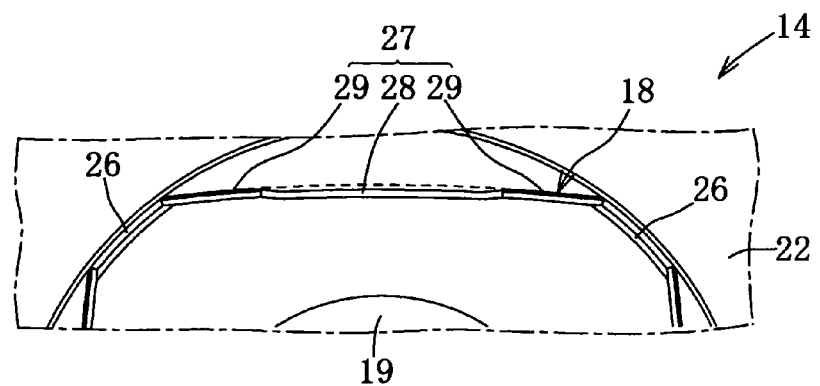
FIG. 9 is an enlarged bottom view of an essential portion of FIG. 8.

Each of the plurality of side portions 27 of the tapered male engagement portion 18 has a concave release portion 28 that is formed at its central portion, and a pair of contact surfaces 29 on both sides of this concave release portion 28 that are formed by chamfering (refer to FIG. 9). The concave release portions 28 of the tapered male engagement portion 18 are shaped as shallow grooves along the sloping surfaces of the male engagement portion definition member 14 in their axial direction. The ranges occupied by the concave release portions 28 are around half of the side portions.

This article positioning mechanism 10 is adapted so that, when the holder member 11 is fixed to the mounting portion 2 via the frame shaped member 12 by the four bolts 4 (i.e., by the fixing means), the tapered male engagement portion 18 engages with the tapered female engagement portion 38 in a closely contacting manner, due to elastic deformation of the outer peripheral side wall portions 12a of the tapered female engagement portion 38 through a few μm in the radially outward direction from the axis 2a and in the direction to approach the mounting portion 2. In this state in which the tapered male engagement portion 18 is engaged in a closely contacting manner with the tapered female engagement portion 38, slight clearances are formed between the circular arcuate corner portions 26 and the circular arcuate corner portions 46, and between the concave release portions 28 and the concave release portions 48 (refer to FIG. 6), and the pairs of contact surfaces 29 engage with the pairs of contact surfaces 49 in a closely contacting manner (refer to FIG. 7). It should be understood that it would also be acceptable to provide a structure in which the holder member 11 is fixed to the frame shaped member 12 by a fixing means such as bolts or the like.

Next, the operation of this article positioning mechanism 10 and the advantages obtained thereby will be explained.

First, in order to fix the holder member 11 to the mounting portion 2 of the turret 1, in the state in which the rotational phases around the axis 2a of the male engagement portion definition member 14 of the holder member 11 and of the frame shaped member 12 that is fixed to the mounting portion 2 have been brought to agree with one another, the holder member 11 is engaged to the frame shaped member 12, and the contact surfaces 29 of the tapered male engagement portion 18 are brought into gentle contact with the contact surfaces 49 of the tapered female engagement portion 38. It should be understood that, at this time, gaps of around 0.03 to 0.15 μm are defined between the four position regulation surfaces 17 of the male engagement portion definition member 14 of the holder member 11 and the reference surfaces 37 of the frame shaped member 12.

Next, when the four bolts 4 have been inserted into the corresponding bolt installation holes of the holder member 11 and have been passed through the through holes 21 of the male engagement portion definition member 14 and the through holes 43 of the frame shaped member 12 and have been screwingly engaged into the bolt holes 5 of the mounting portion 2 of the turret 1, so that the holder member 11 is fixed to the mounting portion 2 via the frame shaped member 12, the contact surfaces 29 of the tapered male engagement portion 18 are engaged in a closely contacting manner with the contact surfaces 49 of the tapered female engagement portion 38 via elastic deformation of the outer peripheral side wall portion 12a of the tapered female engagement portion 38 in the radial direction away from the axis 2a and in the direction to approach the mounting portion 2, and thereafter the positioning in the direction of the axis 2a is completed along with the position regulation surfaces 17 contacting against the reference surface 37 and being stopped by the above elastic deformation. This elastic deformation includes both compressive elastic deformation of the upper circumferential wall portion 41 in the radial direction and also elastic deformation thereof in the direction of the axis 2a.

By the position regulation surfaces 17 of the holder member 11 being closely contacted against the reference surface 37 of the frame shaped member 12, it is possible to position the holder member 11 at high accuracy in the direction of the axis 2a of the mounting portion 2. And, by the contact surfaces 49 of the tapered female engagement portion 38 being closely contacted against the contact surfaces 29 of the tapered male engagement portion 18, it is possible to position the holder member 11 at high accuracy in the radial direction away from the axis 2a. Furthermore, it is possible to position the rotational phase around the axis 2a of the mounting portion 2 at high accuracy, and it is possible to perform restraining action so that the holder member 11 does not rotate around the axis 2a with respect to the mounting portion 2. In this manner it is possible to implement restriction reliably in two planes, without any fine adjustment of the positions of the position regulation surfaces 17 or of the position of the reference surface 37 in the height direction, and moreover without using any movable member provided to the tapered male engagement portion 18 or to the tapered female engagement portion 38.

Since, when the holder member 11 is fixed to the mounting portion 2 or the frame shaped member 12 by the bolts 4 (i.e., by the fixing means) in this manner, the tapered male engagement portion 18 is engaged to the tapered female engagement portion 38 in a closely contacting manner via elastic deformation of the outer peripheral side wall portion 12a of the tapered female engagement portion 38 in the radial direction away from the axis 2a and in the direction to approach the mounting portion 2, accordingly, with this article positioning mechanism 10, it is possible to position the holder member 11, to which the tool T1 is fixed, at high accuracy with respect to the mounting portion 2, and moreover it is possible reliable to restrict rotation thereof. To make a comparison with the case in which positioning and moreover rotational restriction are performed by using a structural member that is small, such as a plurality of pairs of keys and key grooves, with the present application, it is possible to enhance the rigidity of the article positioning mechanism 10, since the positioning and rotational restriction are performed by using the tapered male engagement portion 18 and female portion 38 that are formed in the shapes of regular quadrilaterals. Since only the one pair consisting of the tapered male engagement portion 18 and the tapered female engagement portion 38 is engaged together, accordingly, it is possible to perform the engagement more smoothly as compared with the use of a plurality of combinations of key grooves and keys; and an article positioning mechanism 10 is obtained whose durability is excellent, since it is possible to avoid superfluous contacting between the male and female tapered engagement portions 18 and 38.

Since each of the plurality of side portions 27, 47 of the tapered male engagement portion 18 and the tapered female engagement portion 38 has the concave release portion 28, 48 formed at its central portion and the pair of contact surfaces 29, 49 formed at both sides of this concave release portion 28, 48, accordingly, when the tapered male engagement portion 18 and the tapered female engagement portion 38 are engaged together in a closely contacting manner, the accuracy of positioning in the direction orthogonal to the axis 2a of the mounting portion 2 and the rotation restricting force are enhanced, because the number of closely contacting spots due to the pair of contact surfaces 29, 49 is doubled. Moreover, it is possible to promote the elastic deformation in the radially outwards direction and to enhance the quality of the attachment, since the compressive stress of the pairs of contact surfaces 29, 49 is increased due to the provision of the concave release portions 28, 48 on the side portions 27, 47. Furthermore it is possible to reduce the processing cost for grinding and polishing, since it is not necessary to perform any grinding or polishing processing on the surfaces of the concave release portions 28, 48.

Since the regular polygonal shapes of the tapered male engagement portion 18 and of the tapered female engagement portion 38 are the shape of a regular quadrilateral, and since each of the plurality of side portions 27, 47 of the tapered male engagement portion 18 and of the tapered female engagement portion 38 is formed as a circular arc that bulges slightly outwards, accordingly, when the tapered male engagement portion 18 and the tapered female engagement portion 38 are engaged together in a closely contacting manner, the contact areas between the side portions 27 of the tapered male engagement portion 18 and the side portions 47 of the tapered female engagement portion 38 are increased, so that it is possible to perform centering of the holder member 11 at high accuracy, and it is possible to enhance the level of concentricity.

Since the annular space 40a for promoting elastic deformation in the direction to approach towards the mounting portion 2 when the tapered male engagement portion 18 is engaged to the tapered female engagement portion 38 in a closely contacting manner is formed at the inner side of the outer peripheral side wall portion 12a of the tapered female engagement portion 38, accordingly, due to this annular space 40a, it is possible to promote elastic deformation of the tapered female engagement portion 38 of the frame shaped member 12 in the direction to approach towards the mounting portion 2.

Since the holder member 11 has the male engagement portion definition member 14 on which the tapered male engagement portion 18 is formed, and the holder main body 16 to which this male engagement portion definition member 14 is fixed with the plurality of bolts 15, accordingly the productivity is enhanced in comparison with a case of forming the tapered male engagement portion 18 integrally with this holder main body 16, and, since this male engagement portion definition member 14 is fixed to the holder main body 16 by the plurality of bolts 15, accordingly it is possible to apply it to holder main bodies 16 of various different shapes.

Since the movable member of the mechanical device is the turret 1 of a turret type lathe, with this turret 1 having the plurality of mounting portions 2 on its outer peripheral portion, and since the frame shaped members 12 is provided to each of these mounting portions 2, accordingly it is possible to position the plurality of holder members 11 at high accuracy with respect to the plurality of mounting portions 2 of this turret 1 of a turret type lathe, and moreover it is possible reliably to restrict their rotation with respect thereto.

Since the frame shaped member 12 is positioned on the mounting portion 2 with the plurality of knock pins 8 and is fixed thereto with the plurality of bolts 6, and since this frame shaped member 12 can be repeatedly fitted to and removed from the mounting portion 2, accordingly the repeatability is enhanced, and the productivity is enhanced in comparison with a case of forming the tapered female engagement portion 38 integrally with this mounting portion 2.

It should be understood that, in this embodiment, the holder member 11 has been described as an example, also, just as in the case of the holder member 11, the other holder members 11A through 11C have male engagement portion definition members 14 on which tapered male engagement portions 18 are formed, and also have holder main bodies 16A through 16C of shapes that correspond to the tools T2, S1, and S2, to which the male engagement portion definition members 14 are fixed by pluralities of bolts 15. In each of these holder main bodies 16A through 16C as well, just as in the case of the holder main body 16, there are formed four bolt installation holes 34 for fixing them to their corresponding mounting portions 2 using four bolts 4 (i.e., fixing means).

Next, variant examples in which this embodiment is partially altered will be explained.

Figure 12:
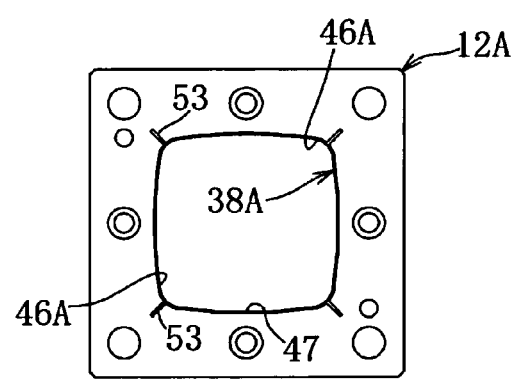
FIG. 12 is a plan view of a plane shaped member according to a variant embodiment.

[1] As shown in FIG. 12, as elements for promotion of elastic deformation, it would also be acceptable to form a plurality of slits 53 extending outwards in the radial direction at the circular arcuate corner portions 46A of the tapered female engagement portion 38A of the frame shaped member 12A. With this structure, when the tapered male engagement portion 18 and the tapered female engagement portion 38A are engaged together in a closely contacting manner, it is possible to promote elastic deformation of the outer peripheral side wall portion 12a of the tapered female engagement portion 38A in the radial direction outward from the axis 2a and also in the direction to approach towards the mounting portion 2.

Figure 13:
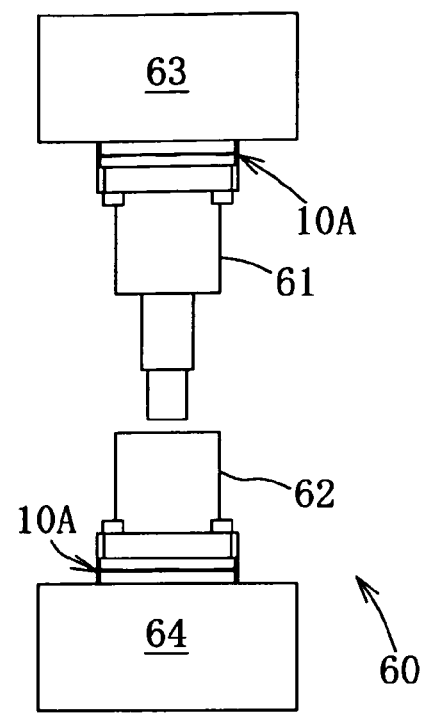
FIG. 13 is a side view of a mechanical device and an article positioning mechanism according to another variant embodiment.

[2] Not only can the article positioning mechanism 10 be applied to the turret 1 of a turret type lathe, but, as with the article positioning mechanisms 10A shown in FIG. 13, it can also be applied to a pressure forming machine 60, or indeed to mechanical devices of various other types. In this case, due to the article positioning mechanisms 10A, it is possible to position a punch 61 or a die 62 reliably and at high accuracy with respect to a ram 63 or a mounting portion of a stand 64 (that corresponds to a movable element), and moreover it is possible reliably to restrict the rotation thereof.

[3] The shape of each of the plurality of side portions 27, 47 is not necessarily limited to being a circular arc that bulges slightly outward; they could also be formed in the shape of straight lines.

[4] It is not necessary for the shape of the tapered male engagement portion 18 and the tapered female engagement portion 38 to be limited to being a rectangular quadrilateral; these members could also be made in various other regular polygonal shapes, such as in the shape of a regular pentagon or a regular hexagon or the like.

[5] While, in this embodiment the male engagement portion definition member 14 on which the tapered male engagement portion 18 is formed is fixed to the holder main body 16, and the frame shaped member 12 on which the tapered female engagement portion 38 is formed is fixed to the mounting portion 2, the present invention is not necessarily particularly limited to this structure; it would also be acceptable to provide a structure in which the male engagement portion definition member 14 is fixed to the mounting portion 2, and the frame shaped member 12 is fixed to the holder main body 16.

[6] While, in this embodiment, the position regulation surfaces 17 and the tapered male engagement portion 18 are formed on the holder member 11, and the reference surface 37 and the tapered female engagement portion 38 are formed on the frame shaped member 12, it would also be acceptable to provide a structure in which, in the converse manner to the structure above, the position regulation surfaces 17 and the tapered male engagement portion 18 are formed on the frame shaped member 12, and the reference surface 37 and the tapered female engagement portion 38 are formed on the holder member 11.

[7] Apart from the above, it would also be possible to implement the present invention by supplementing various alterations to the above embodiment, within the range in which the gist of the present invention is not departed from.

The article positioning mechanism of the present invention can be applied to various types of mechanical device such as a machine tool or a robot or the like, or to other applications.

EXPLANATION OF THE REFERENCE NUMERALS

1: turret
2: mounting portion
2a: axis
4: bolt (fixing means)
8: knock pin
10, 10A: article positioning mechanism
11 ... 11C: holder members
12: frame shaped member
12a: outer peripheral side wall portion
14: male engagement portion definition member
16 ... 16C: holder main body
17: position regulation surface
18: tapered male engagement portion
26: circular arcuate corner portion
27: side portion
28: concave release portion
29: contact surface
37: reference surface
38, 38A: tapered female engagement portions
40a: annular space
46: circular arcuate corner portion
47: side portion
48: concave release portion
49: contact surface

The invention claimed is:

1. An article positioning mechanism for positioning of an article, the article comprising a component or a tool with respect to a mounting portion of a movable member of a mechanical device so as to restrict the rotation of the article, the article positioning mechanism comprising:
  a holder member to which said article is fixed and a frame shaped member fixed to said mounting portion;
  said holder member comprising a position regulation surface that is orthogonal to an axis of said mounting portion, and a tapered male engagement portion formed in a regular polygonal shape that, in cross section in a direction orthogonal to said axis, has a plurality of circular arcuate corner portions that are convex outwards and a plurality of side portions, and that is sloped in such a manner that the closer the tapered male engaging portion is to said mounting portion, the closer the tapered male engaging portion is to said axis;
  said frame shaped member comprising a reference surface that receives and stops said position regulation surface and positions said position regulation surface in an axial direction, and a tapered female engagement portion formed in a regular polygonal shape that, in cross section in the direction orthogonal to said axis, has a plurality of circular arcuate corner portions that are convex outwards and a plurality of side portions, and that slopes in a same direction as said tapered male engagement portion; and
  when said holder member is fixed to said mounting portion or to said frame shaped member by a fixing means, said tapered male engagement portion is engaged to said tapered female engagement portion in a closely contacting manner via elastic deformation of an outer peripheral side wall portion of said tapered female engagement portion in a radial direction outwards from said axis and in a direction towards said mounting portion.

2. The article positioning mechanism according to claim 1, wherein
  each one of a plurality of side portions of said tapered male engagement portion has a concave release portion formed at a central portion and a pair of contact surfaces formed at both sides of the concave release portion; and
  each one of a plurality of side portions of said tapered female engagement portion has a concave release portion formed at a central portion and a pair of contact surfaces formed at both sides of the concave release portion of said one of the plurality of side portions of said tapered female engagement portion.

3. The article positioning mechanism according to claim 1, wherein the rectangular polygonal shape of each of said tapered male engagement portion and said tapered female engagement portion is a regular quadrilateral, each of the plurality of side portions of said tapered male engagement portion is formed as a circular arc that bulges slightly outwards, and each of the plurality of side portions of said tapered female engagement portion also is formed as a circular arc that bulges slightly outwards.

4. The article positioning mechanism according to claim 3, wherein an annular space is formed on an inner side of an outer peripheral side wall portion of said tapered female engagement portion for promoting elastic deformation in the direction towards said mounting portion when said tapered male engagement portion is engaged with said tapered female engagement portion in a closely contacting manner.

5. The article positioning mechanism according to claim 3, wherein said holder member comprises a male engagement portion definition member on which said tapered male engagement portion is formed, and a holder main body to which the male engagement portion definition member is fixed by a plurality of bolts.

6. The article positioning mechanism according to claim 1, wherein said movable member of said mechanical device is a turret of a turret type lathe, and this turret comprises a plurality of said mounting portions on an outer peripheral portion of said turret, with said frame shaped member being provided to each of said mounting portions.

7. The article positioning mechanism according to claim 6, wherein said frame shaped member is positioned with respect to said mounting portion by a plurality of knock pins and is fixed thereto by a plurality of bolts.

8. The article positioning mechanism according to claim 2, wherein the rectangular polygonal shape of each of said tapered male engagement portion and said tapered female engagement portion is a regular quadrilateral, each of the plurality of side portions of said tapered male engagement portion is formed as a circular arc that bulges slightly outwards, and each of the plurality of side portions of said tapered female engagement portion also is formed as a circular arc that bulges slightly outwards.

9. The article positioning mechanism according to claim 8, wherein an annular space is formed on an inner side of an outer peripheral side wall portion of said tapered female engagement portion for promoting elastic deformation in the direction towards said mounting portion when said tapered male engagement portion is engaged with said tapered female engagement portion in a closely contacting manner.

10. The article positioning mechanism according to claim 8, wherein said holder member comprises a male engagement portion definition member on which said tapered male engagement portion is formed, and a holder main body to which the male engagement portion definition member is fixed by a plurality of bolts.

* * * * *